United States Patent Office 3,690,847
Patented Sept. 12, 1972

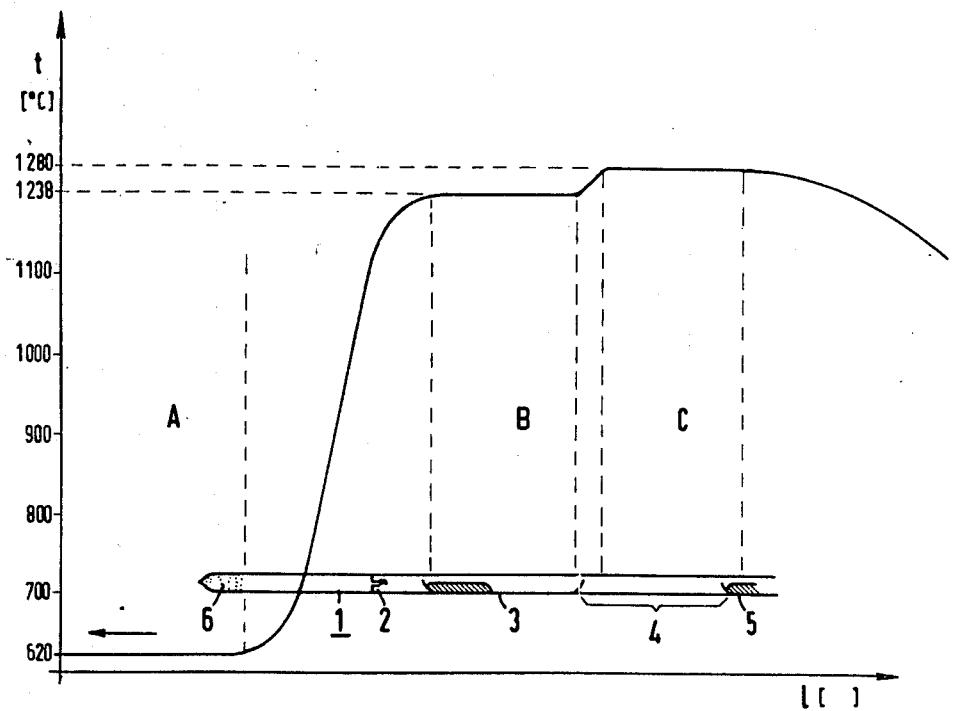

3,690,847
METHOD OF PRODUCING HIGHLY PURE, PARTICULARLY SILICON FREE GALLIUM ARSENIDE
Hans Merkel and Siegfried Leibenzeder, Erlangen, Germany, assignors to Siemens Aktiengesellschaft, Berlin and Munich, Germany
Filed Aug. 18, 1970, Ser. No. 64,770
Claims priority, application Germany, Aug. 27, 1969, P 19 43 550.8
Int. Cl. C01b 27/00; C01f 15/00
U.S. Cl. 23—294
6 Claims

ABSTRACT OF THE DISCLOSURE

Method of producing highly pure gallium arsenide. The product is particularly silicon free. The method utilizes the "two temperature" technique. Two gallium bodies are provided, the first is at a temperature slightly above the melting point of gallium arsenide and the second is at a temperature of 1250° to 1350° C.

In modern electronics, the semiconducting compound gallium arsenide is becoming increasingly technologically important. Various methods have become known for its production in compact form. These methods in general are not satisfactory since for reasons which will be described later on, they can yield only very much contaminated gallium arsenide. On the other hand, the users and consumers of said semiconductor substance place increasingly higher demands upon its purity. It is widely known that the production of this specific semiconductor in a compact, highly pure form, is particularly difficult in comparison to the highly pure production of other semiconductor materials and creates particular technical problems.

The semiconductor gallium arsenide always forms when arsenic or arsenic vapor acts upon gallium at elevated temperatures. This simple mechanism is the basis of all methods for the production of the semiconductor in compact form, for example, in rod form. The best known and heretofore virtually only method used is the so called horizontal "two-temperature" method which is very specifically described by F. A. Cummell in the monograph: Compound Semiconductors, vol. 1, Reinhold Publishing Corporation, New York, 1962, p. 207 et seq. In carrying out this method, two temperature ranges are to be adjusted in a synthesis ampule of pure quartz glass: one range where the gallium is contained in a boat of pure quartz glass, must be maintained at a temperature above the melting point of the gallium arsenide being produced, i.e. above 1238° C.; the other range is where the solid arsenic is heated to 620° C. whereby the arsenic vapor of approximately 1 atm. pressure results and fills out the entire ampule reacting in the hot part with the gallium and forming gallium arsenide. A 100% reaction of the gallium with arsenic or its vapor can only be achieved if the gallium arsenide formed remains in the molten form. At lower temperatures, the gallium would become coated only with a thin, dense gallium arsenide layer and following its formation the reaction would come to a standstill. That is the greater portion of the gallium would not be converted into gallium arsenide. If, on the other hand, the arsenic were heated to the same temperature as the gallium, i.e. above 1238° C., the ampule would burst as a result of the very high arsenic vapor pressure that would occur thereby.

The above, briefly described two temperature method used for producing compact gallium arsenide uses the purest possible quartz glass as the material for the synthesis ampule and for the boat wherein the gallium arsenide is formed in the high temperature portion. This material has proven superior to all other materials which could possibly be employed for this purpose. One accepts, knowingly, a big disadvantage at the same time. At the high synthesis temperature, the gallium, as well as the gallium arsenide, reacts with the $SiO_2$ of the quartz boat forming silicon as well as gaseous reaction products primarily SiO. The Si dissolves also in the molten gallium arsenide and remains as an impurity in rather high concentration even following the solidification and the crystallization of the semiconductor. According to a published paper by J. M. Woodall et al., in Solid State Com. 4 (1966) 33 to 36, the concentration of this impurity coinciding with other publications, amounts to even under the best circumstances, to at least $5 \times 10^{16}$ to $10^{17}$ atoms Si per cm.$^3$ GaAs, but usually to much more.

The technical utilization of the gallium arsenide that is so strongly contaminated with silicon is considerably narrowed and must be limited, finally, to a few uses. The disadvantage associated with known methods for producing compact gallium arsenide, which without exception yielded a semiconductor with a high concentration of impurities can be eliminated through the method according to the invention.

The object of the invention is a method for producing highly pure particularly silicon free gallium arsenide in form of a compact crystal rod out of gallium and arsenic vapor in a quartz ampule which is filled with arsenic vapor of 1 atm. during the formation of gallium arsenide and is so characterized that in one region of the ampule gallium contained in a boat of quartz glass is heated to a temperature which is slightly above the melting point of the gallium arsenide 1238° C. while in another region of the ampule, in a second quartz boat, gallium is heated to higher temperatures up to 1280° C. and above and after the completed formation of gallium arsenide in the boat which was heated only slightly above the melting point of the gallium arsenide the latter is made to crystallize through cooling of the ampulla. The gallium arsenide is highly pure and free of silicon.

According to this method, silicon free gallium arsenide crystal rods with carrier concentrations around $10^{15}$ per cm.$^3$ GaAs, are obtained at electron mobilities around 6000 cm.$^2$/Vs.

It was found particularly preferable to maintain the higher heated gallium at a temperature of 1250° C. to 1350° C. preferably at 1280° C. and to maintain the main volume of gallium at a temperature of 1240° C.

Frequently, particularly in view of the economy of the method, only relatively small amounts of gallium need be placed into the quartz boat, heated to 1280° C. As little as $10^{-4}$ g. may be used. Tests have shown that, for example, in a small installation where about 30 g. gallium were installed into a boat and heated only to 1240° C., 1 g. gallium is fully effective in the higher heated boat.

Proof could be obtained that the yields are particularly high when a narrow point is installed betwen the "cool" arsenic portion part heated to 620° C. and the high temperature portion which functions as a diffusion blockage whereby the arsenic vapor may flow with great intensity to the hot portion but would certainly be prevented from it through the escape of gaseous reaction products which occur in the hot part.

Aluminum arsenide, aluminum phosphide, aluminum antimonide, gallium phosphide, gallium antimonide, indium arsenide and indium phosphide may also be produced according to the method of the invention.

The drawing schematically shows an embodiment of the invention.

In the drawing one sees a reaction tube 1 having a section wall with a capillary that is a diffusion blockage at 2. At 3 is a boat with about 30 g. gallium with another small boat fused to the first at 5 via spacer 4. The spacer 4 serves for easier loading of the reaction tube 1 with the gallium and prevents shifting of the boats 3 and 5 toward each other. The boat combination 3/5 is so positioned within the reaction tube 1, that the main amount of gallium at 3, within the temperature range B, is heated only slightly above the melting point of 1238° C. of gallium arsenide while a very small share of gallium of approximately 1 g. is maintained at 5 within the temperature range of C at about 1280° C. The arsenic 6, necessary for the formation of stoichiometric gallium arsenide, as well as a small excess thereof which, during synthesis produces in the free gas volume an arsenic pressure that is equal to the thermal dissociation pressure of the gallium arsenide, is within the temperature range A and is maintained at a temperature of 620° C. Following the synthesis and the adjustment of the temperature equilibrium the furnace system is moved away from the reaction tube 1 with a pulling velocity of about 2 cm./h.

In the above described device 60 g. of the gallium arsenide according to the invention were produced following the oriented solidification. It had a charge carrier concentration of $10^{15}/cm.^3$ and an electron mobility of approximately 6000 cm.$^2$/Vs.

We claim:

1. Method of producing highly pure, particularly silicon free, gallium arsenide in form of a compact crystal rod from gallium and arsenic vapor in a quartz ampule, which is filled with arsenic vapor of 1 atm. during the formation of gallium arsenide, which comprises heating gallium in a first quartz boat in one region of the ampule to a temperature which is only slightly above the melting point of the gallium arsenide, namely 1238° C., while heating gallium in a second quartz boat in another region of the ampule to a higher temperature of 1250° C. to 1350° C. to thereby initiate the formation of SiO vapor from the $SiO_2$ of the second quartz boat, completing the formation of the gallium arsenide in the first boat at lower temperatures with the arsenic vapor present, crystallizing the gallium arsenide formed by cooling the first boat.

2. The method of claim 1, wherein the amount of gallium in the second quartz boat is above $10^{-6}$ g.

3. The method of claim 2, wherein the gallium in the second quartz boat is about 1 g.

4. The method of claim 3, wherein the gallium in the second quartz boat is maintained at a temperature of about 1280° C. and main volume of gallium in the first boat is kept at a temperature of 1240° C.

5. The method of claim 1, wherein the escape of the gaseous reaction products which form in the hotter portion of the reaction system at the second boat is prevented.

6. The method of claim 5, wherein the escape of SiO is prevented.

References Cited
UNITED STATES PATENTS

| | | | |
|---|---|---|---|
| 3,242,015 | 3/1966 | Harris | 148—1.6 |
| 3,277,006 | 10/1966 | Johnson | 148—1.6 |
| 3,322,501 | 5/1967 | Woodall | 148—1.6 |
| 3,353,912 | 11/1967 | Ainslie | 23—204 |
| 3,480,394 | 11/1969 | Merkel | 23—204 |

NORMAN YUDKOFF, Primary Examiner

S. SILVERBERG, Assistant Examiner

U.S. Cl. X.R.

23—204